United States Patent [19]

Kingston

[11] Patent Number: 4,574,514
[45] Date of Patent: Mar. 11, 1986

[54] FISHING LURE

[76] Inventor: Charles W. Kingston, Pineshores Rd., Goulais River, Ont. K0A 1E0, Canada

[21] Appl. No.: 494,892

[22] Filed: May 16, 1983

[51] Int. Cl.⁴ ............................................. A01K 85/00
[52] U.S. Cl. ..................................................... 43/42.5
[58] Field of Search ................... 43/42.5, 42.51, 42.11, 43/42.12, 42.13, 42.14, 42.16, 42.18, 42.2, 42.46

[56] References Cited

U.S. PATENT DOCUMENTS

| | | | |
|---|---|---|---|
| 2,058,121 | 10/1936 | Allen | 43/42.5 |
| 2,478,085 | 8/1949 | Bruington | 43/42.5 |
| 2,535,211 | 12/1950 | Jelinek | 43/42.5 |
| 2,559,042 | 7/1951 | Norris | 43/42.51 |
| 2,575,609 | 11/1951 | Alderman | 43/42.5 |
| 2,631,397 | 3/1953 | Angell | 43/42.16 |
| 2,698,494 | 1/1955 | Larsen | 43/42.5 |
| 2,796,693 | 6/1957 | Gunterman | 43/42.09 |
| 3,738,045 | 6/1973 | Harris | 43/42.12 |
| 4,110,930 | 9/1978 | Daniels | 43/42.14 |
| 4,155,192 | 5/1979 | Varaney | 43/42.5 |

FOREIGN PATENT DOCUMENTS

| | | | |
|---|---|---|---|
| 151682 | 11/1937 | Austria | 43/42.16 |
| 215833 | 2/1922 | Canada | |
| 1020747 | 11/1977 | Canada | 43/59 |
| 509753 | 10/1930 | Fed. Rep. of Germany | 43/42.46 |
| 337200 | 12/1903 | France | 43/42.2 |

Primary Examiner—Nicholas P. Godici
Assistant Examiner—Kurt Rowan
Attorney, Agent, or Firm—Laubscher & Laubscher

[57] ABSTRACT

A fish lure of the type having a plate-like, V-shaped cross-section or configuration, formed from a drop-shaped plate. The pointed leading end of the lure is provided with means for securement of the lure to a fishing line. The trailing, rounded, relatively wide end portion comprises an outwardly bent small spoiler. The advance in the art is that the lure combines the ease of manufacture due to a simple exterior shape with the capability of movement, when moved through the water, similar to the natural movement of a struggling or lame prey fish.

3 Claims, 3 Drawing Figures

FISHING LURE

BRIEF DESCRIPTION OF THE PRIOR ART

The present invention relates to a fish lure of the type having a drop-shaped plate-like body and adapted to be towed through the water and to exert a movement similar to the movement of a struggling or lame prey fish.

Various lures adapted for the above behaviour when towed through the water are known. They are all relatively expensive to produce.

An example of known prior art is shown in U.S. Pat. No. 2,796,693 issued June 25, 1957 to Charles W. Gunterman. This fishing lure comprises a pear-shaped plate-like body portion which is undulant both in longitudinal and transverse section to produce the movement as described above. The fish lure of the above type is relatively expensive to produce.

SUMMARY OF THE INVENTION

It is an object of the present invention to provide a fish lure which is capable of being relatively simply produced and which would secure, as it moves through the water, a movement similar to the natural movement of a struggling prey fish.

According to the invention, a fish lure is provided which has a drop-shaped plate-like body comprising a narrow, pointed leading end portion and a wide, rounded trailing end portion; line securement means at the leading end portion for securing of the lure to a fishing line and hook securement means for securing a hook to the lure, said body defining a generally V-shaped cross-sectional configuration formed by a first wing and by a second wing, said wings being disposed one to each side of a generally straight ridge section extending from said leading end portion to said trailing end portion, said first wing being generally planar throughout its entire length and width, said second wing being generally planar throughout a substantial part of its length and width but comprising an end section bent away from the plane of said substantial part, thus forming a spoiler section.

According to another feature of the present invention, the spoiler section is disposed exteriorally of the V-shaped cross-section.

BRIEF DESCRIPTION OF THE DRAWINGS

The invention will now be described in greater detail by way of a preferred embodiment shown in the accompanying drawing in which.

DETAILED DESCRIPTION

Figure 1:
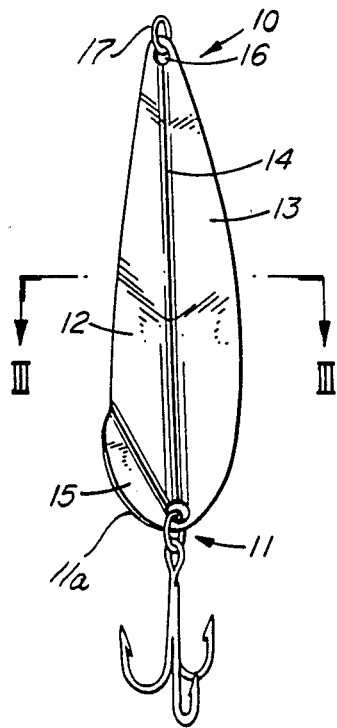
FIG. 1 is a perspective view of the lure showing the "convex" surface portion of the lure, from the standpoint of the bend along the said ridge.
Figure 3:
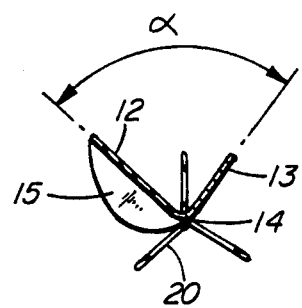
FIG. 3 is section III of FIG. 2.
Figure 2:
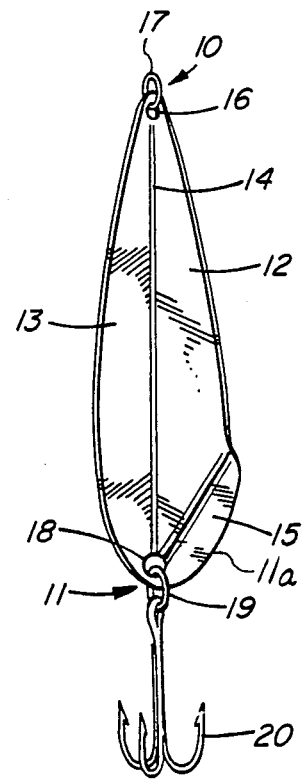
FIG. 2 is a perspective view similar to that of FIG. 1 but showing the opposite or "concave" face of the lure.

The present fish lure is made in different sizes depending on application. Generally, a typical embodiment shown in the drawings is approximately 10 cm long as measured from a leading end 10 to a trailing end 11 thereof. As best seen from FIGS. 1 and 2, the lure is made from a steel metal sheet which is provided with a suitable surface coating or coloring. Such coating or coloring does not form any part of the present invention and therefore is not shown in the enclosed drawings. As shown in the drawings, the lure body is drop-shaped with a relatively wide rounded trailing portion 11 having a single continuous convex uninterrupted edge surface 11a. As best shown from FIG. 3, the lure is of a generally V-shaped cross-sectional configuration including a first wing 12 and a second wing 13. The wings join each other at an integral ridge 14 extending from the trailing end 11 to the leading end 10. FIG. 2 and FIG. 3 shows that the width of the second wing 13 is less than that of the first wing 12. However the relationship can also be reversed or the two wings may be of the same size.

The first wing 12 is bent away near the trailing end 11 of the lure to form an outwardly directed rudder or spoiler 15 which normally gives the lure the desired "side kick" imitating of the movement of the prey fish. The angle α (FIG. 3) betweenthe generally planar wings 12 and 13 is approximately 85 degrees but may vary to a greater or lesser degree from the value, it having been found out that the lure will preform sucessfully within virtually any angle from about 60 degrees to about 120 degrees. FIGS. 1 and 2 show an aperture 16 at the leading end 10 of the lure. The aperture 16 is shown as being engaged with an eyelet 17 which serves the purpose of securement of the lure to a fishing line (not shown). Thus, the aperture 16 forms a preferred embodiment of means for securement of the lure to a fishing line. As shown in FIGS. 1 and 2, the aperture 16 is generally coincident with the line of elongation of the ridge 14.

On the other hand, an aperture 18 at the trailing end 11 of the lure is provided in the ridge 14. An eyelet 19 of a fishing hook 20 passes through the latter aperture 18. Thus, in the preferred embodiment, the aperture 18 forms what can be referred to as "means for securement of a fishing hook to a lure".

Those skilled in the art will appreciate that despite a simple structural configuration of the lure of the present invention, a relatively wide variety of different shapes and configuration can be produced, which departs from the description as referred to above while still falling within the scope of the present invention as recited in the accompanying claims.

The embodiments of the invention in which an exclusive property or privilege is claimed are defined as follows:

1. A fish lure comprising
 (a) a generally drop-shaped plate-like body having a narrow pointed leading end portion and a relatively wide rounded trailing end portion, said trailing end portion having a single continuous convex uninterrupted edge (11a);
 (b) line securement means adjacent said leading end portion of the body for securing the lure to a fishing line; and (c) hook securement means adjacent said trailing end portion of the body for securing a hook to the lure;
 (d) said body having a generally V-shaped cross-sectional configuration defining first and second non-symmetrical longitudinally extending wings of unequal widths, respectively, disposed on opposite sides of a longitudinally extending generally straight ridge section extending the entire length of said body from said leading end portion to said trailing end portion, said ridge section being generally coincident with a line of intersection of two imaginary planes perpendicular to each other;

(e) said first wing being generally planar throughout its entire length and width;

(f) the forward end portion of said second wing being generally planar throughout a substantial extent of the length of said second wing, the convex uninterrupted edge of the trailing end portion of said second wing being bent away from the plane of said forward end portion to define a spoiler section.

2. A fish lure as claimed in claim 1 wherein the spoiler section is disposed exteriorly of the V-shaped cross-section.

3. A fish lure as claimed in claim 1, wherein the total size of the surface area of said second wing and said spoiler is greater than that of said first wing.

* * * * *